US005768083A

United States Patent [19]

Maki et al.

[11] Patent Number: 5,768,083

[45] Date of Patent: Jun. 16, 1998

[54] METHOD OF SUPPRESSING ELECTROSTATIC ENERGY IN GLASS-TO-METAL HERMETIC SEAL DEVICES

[75] Inventors: Kenneth C. Maki, Coon Rapids; Steven W. Johnson, Minnetonka; Douglas P. McCarron, Minneapolis, all of Minn.

[73] Assignee: Tekna Seal, Inc., Minneapolis, Minn.

[21] Appl. No.: 739,818

[22] Filed: Oct. 30, 1996

[51] Int. Cl.[6] .......... H02H 1/00

[52] U.S. Cl. .......... 361/120; 361/56; 361/111

[58] Field of Search .......... 361/56, 91, 111, 361/118, 117, 127, 120

[56] References Cited

U.S. PATENT DOCUMENTS

| | | | |
|---|---|---|---|
| 1,269,534 | 6/1918 | Gray | 313/622 |
| 1,603,279 | 10/1926 | Gray | 313/622 |
| 1,897,587 | 2/1933 | Pirani | 361/120 |
| 1,990,180 | 2/1935 | Gaidies | 176/122 |
| 2,397,982 | 4/1946 | Salzberg | 250/622 |
| 2,492,295 | 12/1949 | Knochel | 250/622 |
| 2,540,399 | 2/1951 | Linkroum et al. | 350/622 |
| 3,711,735 | 1/1973 | Foster | 313/216 |
| 3,875,467 | 4/1975 | Riedel | 361/120 |
| 5,061,877 | 10/1991 | Akanuma | 313/631 |
| 5,111,110 | 5/1992 | Yagi et al. | 313/622 |
| 5,367,956 | 11/1994 | Fogle, Jr. | 102/202.2 |
| 5,391,961 | 2/1995 | Tsuchiya et al. | 313/634 |

*Primary Examiner*—Jeffrey A. Gaffin
*Assistant Examiner*—Stephen W. Jackson
*Attorney, Agent, or Firm*—Haugen and Nikolai, PA

[57] ABSTRACT

A glass-to-metal hermetic seal device which is adapted for suppressing or dissipating electrostatic energy comprises an improved glass-to-metal hermetic seal, with the interior of the device incorporating and creating a gas-filled electrical discharge tube. The gas is an ionizable gas and may conveniently comprise a mixture of nitrogen and Argon. The devices of the present invention utilize one or more electrodes which enter the gas-filled chamber, and when the electrical field of sufficiently high potential is created within the gas-filled chamber, the gas ionizes and becomes conductive so as to effectively dissipate the field.

7 Claims, 2 Drawing Sheets

METHOD OF SUPPRESSING ELECTROSTATIC ENERGY IN GLASS-TO-METAL HERMETIC SEAL DEVICES

BACKGROUND OF THE INVENTION

The present invention relates generally to an improved glass hermetic seal incorporating a gas-filled electrical discharge tube, and more particularly to such a device which is designed to have operational characteristics which make the device ideally suited for application in combination with pyrotechnic initiation for use in automobiles and other pyrotechnic devices, along with a variety of other applications. For example, the device of the present invention finds utility in a variety of related applications, including general protection for pyrotechnics as well as for use in combination with sensors on pipelines and the like. In motor vehicle applications, particularly automobiles, these inflatable restraints, commonly referred to as "airbags", have been found to trigger inadvertently when exposed to static charges. The operational characteristics of the devices of the present invention effectively and reliably eliminate static charges so as to significantly reduce inadvertent and undesired initiation of these devices.

The gas-filled electrical discharge tubes of the present invention may be utilized to effectively provide a static charge leakage path to ground, thus protecting against inadvertent ignition of the pyrotechnic media due to exposure to high voltage or elevated static charges, the presence of which have been found to result in false initiation of the pyrotechnics. This device serves to protect persons and equipment during production, utilization and servicing of the device due to inadvertent initiation due to the presence of static charges. Because of the rugged construction of the device and its high degree of reliability, a wide variety of other applications exist for the device as well.

In the past, a number of electrical discharge devices have been designed for applications leading to the elimination or reduction of static charges. Frequently, these prior devices have been fabricated as intermittently conductive components such as gas-filled glass envelopes and hence lack the ruggedness and stability required for applications such as required in automotive vehicle restraint systems and other systems having the ability to absorb and withstand shock. The apparatus of the present invention utilizes an external shell or cylinder of steel or other rigid durable material, with the interior of the cylinder being filled with a substantially solid cylinder of glass. Additionally, the outer surface of the glass cylinder is fused during production and effectively bonded to the inner wall surface of the cylindrical shell, thus creating the hermetic seal.

In addition to mechanical properties, certain of the devices of the prior art lack the lifetime requirements for use in this application, with failure of the static buildup eliminator serving to increase the likelihood of inadvertent triggering and inflation of these restraints.

Because of the intended application, production techniques must be developed which combine reliability and longevity, along with low production costs. Because the present devices require only a minimum number of components, and with the adaptation of these components to conventional jig retention and positioning operations, conventional and low-cost production techniques may be employed for the devices of the present invention.

By way of appropriate production techniques, use of conveyor furnaces having controlled atmospheres comprising ionizable gases have been found suitable. The ionizable gas atmosphere is provided in such a way that the residence time permits the ambient gases in the assembly including internal cavities to become uniformly displaced with a charge of the ionizable gas from the furnace atmosphere. Upon sealing, this gas is captured and retained within a chamber formed within the assembly. In this fashion, the gas retention and hermetic sealing is achieved without requiring additional costly operations. As an alternative to conveyor furnaces, enclosed heated chambers heated to elevated temperatures may be used. These batch processing techniques may be employed in order to reduce or further control the volume and other requirements of ionizable gases utilized.

As indicated above, in addition to other applications, one of the primary applications for devices of the present invention is in combination with the pyrotechnic initiation circuit for inflatable restraints or airbags in automobiles. It has been recognized that injuries to automobile passengers involved in collisions are frequently caused by the effects of sudden deceleration, rather than by physical collapse of the passenger compartment. While active restraints such as seatbelts have been recognized for their contributions to passenger safety, legislation in the United States has required vehicles to be fitted with passive restraints which function automatically in the event of a collision.

Airbags typically include a durable inflatable device which is normally rolled and stored in front of the passenger within a compartment within the steering wheel or instrument panel. In addition, airbags are designed for use in other locations in motor vehicles as well. An air or gas distribution system is arranged in communication with a gas generator or other source of gas including compressed air for inflation of the airbag in the event of a collision. Accelerometers are employed to sense a collision force above a certain minimum magnitude for initiation of the charge.

Many automotive safety experts have voiced opposition to airbags because of the dangers posed and injuries sustained, particularly from inadvertent inflation during production, utilization or servicing. Furthermore, the intensity of the noise from explosive devices required to set off the airbag has caused damage to and even rupturing of the ear drums of an operator, passenger, or serviceperson. Thus, it is clear that steps must be taken to carefully and selectively reduce occurrences of inadvertent airbag inflation. The body motion of passengers, operators and/or servicepersons, along with the presence of various electrical and electronic devices in the vehicle compartment are well known sources of creation of static charge. Reduction and/or elimination of such static charges will, of course, correspondingly reduce occurrences of inadvertent inflation.

Among the variety of other applications for the devices of the present invention, pyrotechnic initiators are utilized in a variety of industrial, mining and military applications. By way of example, pyrotechnic initiators may be utilized to interpose barriers for isolation of chambers containing radioactive or other dangerous materials, particularly where safety to personnel or the environment is concerned. It is essential in such applications that the initiators function properly on demand, while it remains equally important that these initiators are not falsely activated due to buildup of static charges or other similar phenomena. Again, reduction and/or elimination of any buildup of static charges will correspondingly reduce the occurrences of inadvertent actuation of systems employing such activation or initiation devices.

SUMMARY OF THE INVENTION

Briefly, in accordance with the present invention, a glass hermetic seal incorporating a gas-filled discharge tube is provided which comprises a body member in the form of a cylindrical sleeve with inner and outer surfaces about a central longitudinal axis. A pair of electrically insulative glass rod segments are disposed in opposed sealed relationship with the inner surface of the sleeve. The zone between the opposed rod segments defines an ionizable gas-filled sealed chamber, with the chamber extending generally transversely to the longitudinal axis of the sleeve. In order to actively position the chamber in the circuit, at least one conductive electrode is provided with its body portion sealingly engaged with and extending through the glass rod and into or through the sealed ionizable gas-filled chamber. When in its operative disposition in the circuit, and when the potential between the electrode and the sleeve becomes sufficiently high to initiate ionization or breakdown of the ionizable gas, a predictable and reliable low resistance path is established between the electrode and the sleeve. Because of the dimensional tolerances, and the reliability and uniformity of the gas fill, the device has been found to reliably and predictably respond to reasonably well defined voltage or potential differences. By way of specific application to certain airbag systems, ionization or breakdown of the ionizable gas must occur in response to voltage or potential differences in an operational window of not less than about 500 volts, and not greater than about 1500 volts. Other windows may be found useful for this and other applications.

In one preferred embodiment of the present invention, an insulative wafer or member of ceramic or high melting ceramic-glass blend is sandwiched between abutting end surfaces of the opposed glass rod segments. The wafer has a channel extending across its diameter, and it is this channel which provides the cavity for accommodating and retaining the ionizable gas fill. This arrangement further facilitates the assembly to use of conventional processing techniques. For example, as the glass forming the rod segments becomes fused, the fusion zone advances from the outer surface inwardly, thus serving to capture the ionizable gas within the preformed cavity within the channel of the interposed wafer. Upon wetting of the inner surface of the sleeve by the glass rod segments, the chamber is securely sealed from further exposure to the ambient as well as from internal leakage.

While a single axially positioned electrode may be employed to serve as an electrode relative to the sleeve, alternative structures are possible wherein two or more electrodes may be provided, with these multiple electrodes being positioned in the cavity in spaced apart relationship, one to another. The magnitude of the spacing or gap may be utilized to establish or otherwise control the potential required to initiate ionization and corresponding electrical conductivity for the ionizable gas. In such multiple electrode structures, the gas envelope remains the same as that previously discussed, with the difference being the availability of electrode-to-electrode spacing as a parameter to control triggering of the gaseous breakdown.

Therefore, it is a primary object of the present invention to provide an improved glass hermetic seal incorporating an ionizable gas-filled electrical discharge tube which employs a body member in the form of a cylindrical sleeve having a glass rod sealed therewithin, and with at least one electrode being positioned within the glass rod, the arrangement including an ionizable gas-filled sealed chamber internally of the glass rod for achieving breakdown of the gas in the chamber to create a conductive path between the electrodes or electrode and sleeve in response to the presence of an electrical potential across spaced conductors.

It is a further object of the present invention to provide a glass hermetic seal incorporating a gas-filled electrical discharge tube as described which includes an outer cylindrical sleeve with a glass rod sealed therewithin, and wherein the glass rod includes an assembly of a wafer in alignment with and sandwiched between and in contact with a pair of axially opposed glass rod segments, and wherein the wafer is formed with a grooved channel extending diametrically thereof to define an ionizable gas-filled sealed chamber, and wherein the composition of the wafer is such that it has a flow point or melting point which is slightly elevated from that of the mating glass rod segments.

It is yet a further object of the present invention to provide a process for preparing hermetically sealed gas-filled electrical discharge tubes, with the process creating discharge tubes with rugged and reliable characteristics, while employing conventional glass/metal assembly processing equipment.

Other and further objects of the present invention will become apparent to those skilled in the art upon a study of the following specification, appended claims, and accompanying drawings.

IN THE DRAWINGS

DESCRIPTION OF THE FIRST PREFERRED EMBODIMENT

Figure 1:
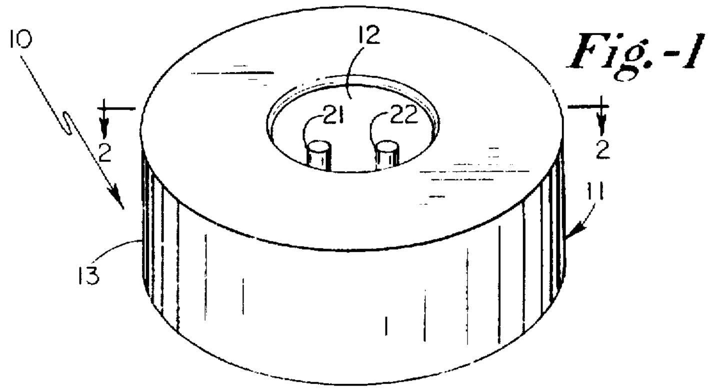
FIG. 1 is a perspective view of a hermetically sealed gas-filled electrical discharge tube prepared in accordance with the present invention.
Figure 2:
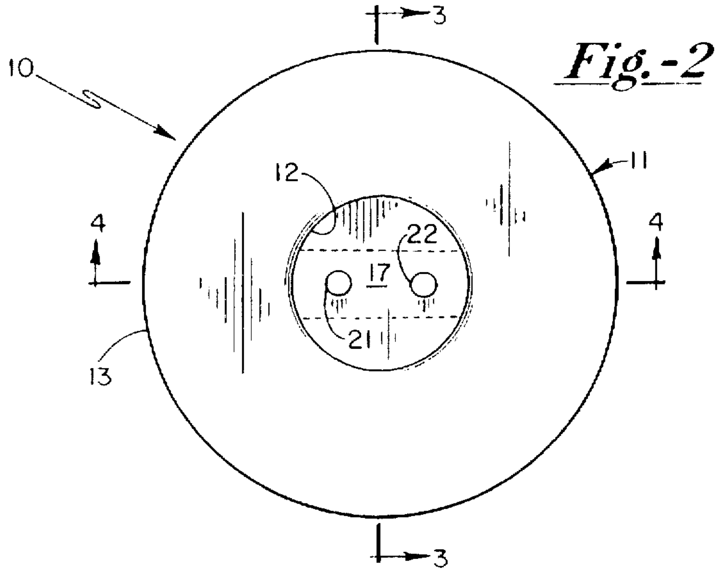
FIG. 2 is a top plan view of the discharge tube of FIG. 1.
Figure 3:
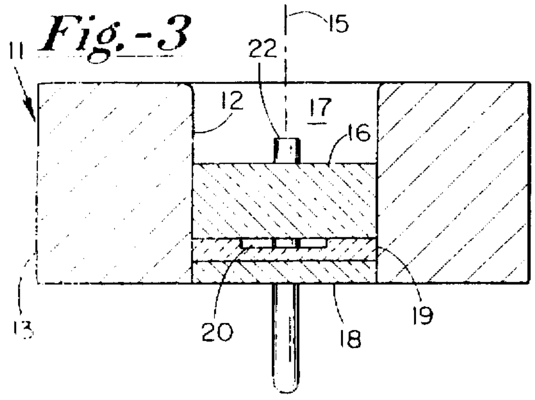
FIG. 3 is a vertical sectional view taken along the line and in the direction of the arrows 3—3 of FIG. 2.
Figure 4:
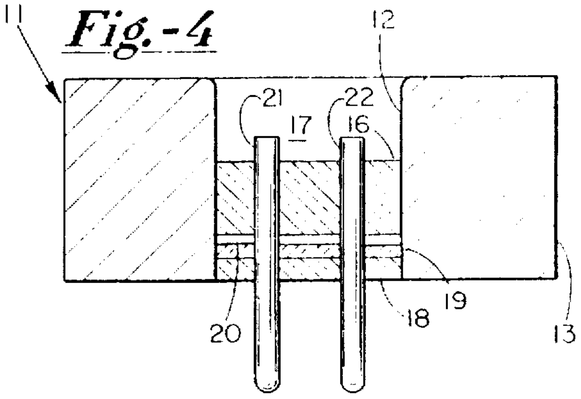
FIG. 4 is a vertical sectional view similar to FIG. 3 taken along the line and in the direction of the arrows 4—4 of FIG. 2, with the sections of FIGS. 3 and 4 being arranged at 90 degrees, one to the other.
Figure 7:
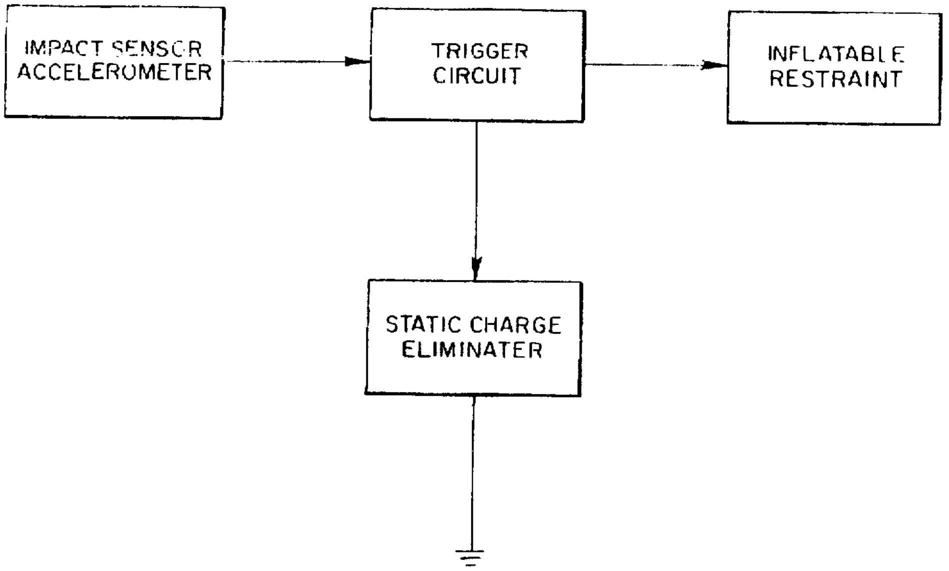
FIG. 7 is a schematic diagram illustrating a typical application for the gas-filled electrical discharge tubes of the present invention in combination with an inflatable restraint or automotive airbag.

In accordance with one of the preferred embodiments of the present invention, the glass hermetic seal incorporating a gas-filled electrical discharge tube 10 comprises a sleeve body member 11 having inner and outer surfaces 12 and 13 respectively. As is apparent, the sleeve 11 has a longitudinal axis as shown at 15. An electrically insulative glass rod segment 16 is positioned within the core 17 of sleeve 11, with the glass rod further comprising a second segment as at 18, with one or more ceramic or glass-filled ceramic wafers 19 being interposed between the opposed inner ends of segments 16 and 18. Wafer 19 is further provided with a channel 20 formed therewithin, which extends diametrically of wafer 19. A pair of electrodes as at 21 and 22 are provided, with electrodes 21 and 22 being sealingly disposed within the glass rod/ceramic wafer arrangement and extending into the zone defined by channel 20.

This embodiment, designated the first preferred embodiment, is one which is normally preferred when considering certain properties, and particularly consistency of performance. In this connection, devices fabricated consistent with this embodiment have been found to perform exceptionally well, considering uniformity of performance characteristics.

FIRST ALTERNATIVE PREFERRED EMBODIMENT

In an alternate preferred embodiment, a single electrode may be employed with the inner surface 12 of sleeve 11 being employed as the second electrode. In either instance, the remaining portions and features of the electrical discharge tube structure are similarly arranged, with the diametrically arranged channel 20 being utilized to capture, retain, and provide for the ionizable gas fill.

This embodiment, designated the first alternate preferred embodiment, is one which is normally preferred when considering size considerations and production costs. The devices fabricated pursuant to this alternative preferred embodiment may be made of somewhat smaller size than those fabricated pursuant to the embodiment designated as the first preferred embodiment.

ALTERNATIVE CONFIGURATIONS

Figure 5:
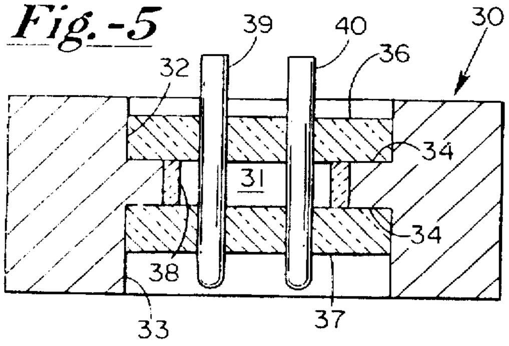
FIG. 5 is a vertical sectional view similar to FIG. 3, but being directed to a modified structural arrangement for a device of the present invention.

With attention now being directed to FIG. 5 of the drawings, it will be noted that cylinder or sleeve generally designated 30 includes a central bore as illustrated at 31 together with counterbores as at 32 and 33. This provides for a supporting shoulder arrangement as at 34—34 providing for a constricted or reduced diameter within the bore portion 31 intermediate end ends. Glass wafers are provided as at 36 and 37 along with a ceramic sleeve as at 38. A pair of electrodes is provided as at 39 and 40 to complete the structure and assembly.

The device configured as in FIG. 5 is, of course, fabricated in accordance with the same techniques as employed in connection with the alternate preferred embodiments described hereinabove. In this connection, the chamber 31 is formed within the structure by geometrically configuring the sleeve 30 in such a way that the shoulder zones such as at 34—34 provides support for the glass wafers. Ceramic sleeve 38 provides additional support for glass wafers 36 and 37 during processing, and also provides electrical insulation between individual electrodes 39 and 40 and metallic cylinder or sleeve 30. In certain embodiments, ceramic sleeve 38 may be deleted from the assembly, thus providing for pin-to-cylinder conductivity. Thus, in such applications, it may be desirable to employ a single electrode such as electrode 39 positioned coaxially with cylinder 30 and thus provide for a single electrode configuration. Normally, the ultimate application of the device will determine the electrode configuration selected.

Figure 6:
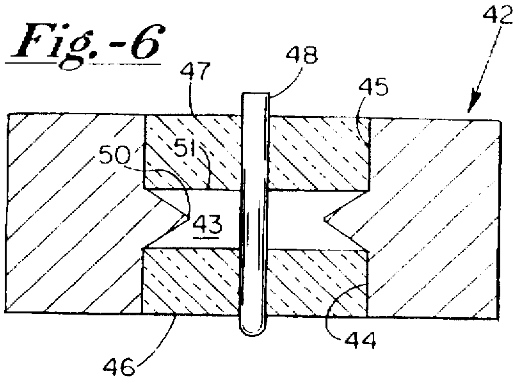
FIG. 6 is a vertical sectional view similar to FIG. 3, but being directed to a further modified structural arrangement for a device of the present invention.

Turning now to the configuration illustrated in FIG. 6, the arrangement is similar to the configurations discussed earlier herein, with cylinder or sleeve 42 being employed with a central bore as at 43 along with tapered counterbores converging on an apex as at 44 and 45. A pair of glass wafers are present as at 46 and 47 along with an axially disposed electrode shown at 48. The configuration of bore 43 is such that an annular taper is formed with the taper increasing with the radius of cylinder or sleeve 42. The annular point created as at 50 has been found to increase the field when an electrical charge is imposed across electrode 48 and the cylinder of sleeve 42. A hermetically sealed chamber is formed within the structure, with the chamber being shown at 51. Of course, in the case of the device of FIG. 5 and FIG. 6, the gas-filled chambers are filled with an ionizable gas such as Argon, and including blends of nitrogen and Argon.

The processing techniques which may be employed for fabrication of the devices of FIGS. 5 and 6 are the same as those that have been described in connection with the other configurations of devices of the present invention.

PROCESSING CONSIDERATIONS

For processing considerations, the discharge tube structures of the present invention may be prepared utilizing conventional glass-to-metal seal production techniques. Continuously fed conveyor ovens with infeed and outfeed air locks may be employed or alternatively closed heated chambers or ovens may be employed. Equipment selection depends upon availability as well as production and other requirements of the processor. In each instance, an ionizable gas, preferably containing Argon, is employed to displace the ambient air and provide the desired fill while processing operations are underway.

In a typical processing operation, a metal sleeve is selected for the body member with electrically insulative glass, such as 2164 glass available from Electro-Glass Corporation of Mammoth, Pa. being employed in the form of a pair of rod-like segments or cylinders. The glass rod segments, such as segments 16 and 18, are arranged in contact with the opposed surfaces of wafer 19. An electrode or electrodes, as the assembly requires, is inserted into bores previously formed in the glass rod segments and wafer assembly so as to extend into the channel 20 formed in wafer 19. The entire assembly is then positioned and retained within a jig, such as the conventionally utilized graphite jig, for exposure to the heat and ionizable gas atmosphere. The ionizable gas atmosphere and temperature control are such that the assembly forming the hermetically sealed gas-filled electrical discharge device is exposed to the ionizable gas atmosphere and flushed for a sufficient time interval so as to provide for complete displacement of the ambience and for equilibrium to be established between the furnace atmosphere and the components, thereby appropriately filling the chamber defined by channel 20, with the ionizable gas comprising the atmosphere, normally an atmosphere including Argon. As indicated herein, the ionizable gas forming the atmosphere may include a mixture of nitrogen and Argon, with the individual gases or mixtures of these gases being introduced into the furnace preferably through an initial discharge of nitrogen gas into the atmosphere followed by a discharge of Argon gas into the atmosphere within the heated chamber. Both the nitrogen and Argon components for the atmosphere are introduced at a point prior to fusion of the glass in order to permit the gaseous atmosphere to displace other gases within the assembly. By way of example, the nitrogen atmosphere is introduced at a zone or point in the front portion of the furnace where the temperature of the assemblies is increasing, but while the assemblies are at a temperature well below the melting point of the glass. Argon is introduced to form an atmosphere to surround and wash the parts at a later point in the thermal process where the assembly temperatures have been raised to a temperature of about 600 degrees C. and higher. The rate of introduction of the individual gases is such that the flow rates provide an atmosphere which on the average is about two-thirds nitrogen, one-third Argon. An appropriate pressure for most processing applications is atmospheric, or just slightly above or below. An appropriate residence time for devices to undergo a complete cycle within the conveyor furnace has been found to be about two hours. Such a process to create such a residence time may be undertaken in a conveyor furnace having a heated/working length of about 30 feet.

Most commercially available glasses suitable for glass hermetic sealing of either compression or matched type can be processed at temperatures in excess of their melting points. One suitable glass for use in connection with the present invention is 2164 glass available from Electro-Glass Corporation of Mammoth, Pa. A processing temperature of approximately 1000 degrees C. is normally satisfactory. For finished devices having diameters between about 0.050 up to 2 inches or more, the unfinished assembly is typically subjected to this elevated temperature for a period sufficient to cause substantially complete fusion of the glass component, and thereby permit the glass rod segments to become bonded or otherwise sealed to the inner surface of the cylindrical sleeve as well as to the surfaces of each of the electrodes.

SECOND ALTERNATIVE PREFERRED EMBODIMENT

As an alternative to the utilization of the ceramic or loaded glass wafer, glass rod segments having a groove formed across the diameter of an inner abutting surface may be utilized. Such a groove may be formed on the surface of one of the segments or, if desired, on both segments. While the grooves may be positioned in axial alignment, one with the other, such alignment is not critical, and grooves arranged along orthogonally disposed axes may be employed. In this arrangement, the ionizable gas present in the atmosphere displaces the ambience of the entire device system, and when the outer surface of the glass rod reaches a fusion temperature, an effective seal is formed along the length of the rod segments, thus retaining the ionizable gas within the preformed chamber or chambers. In other words, it has been found that centrally or medially positioned chambers normally remain intact and definable by virtue of the presence of the gaseous atmosphere. The pressure within the immediate confines of the chamber is such that the inner surfaces of the metallic sleeve defining the chamber are not wetted or coated with the glass, and hence preserve electrical continuity through the chamber between the outer cylinder and the surface of the electrode or electrodes. As is apparent, these processing considerations are applicable to the alternate configurations illustrated in FIGS. 5 and 6, and may be employed appropriately.

In this connection, it will also be clear that the configurations of FIGS. 5 and 6 may include ceramic wafers and/or glass-filled ceramic wafers when other geometrical considerations and performance characteristics of the completed device are taken into account.

By way of materials of construction, it has been found appropriate to fabricate the sleeve as well as the electrodes from steel or stainless steel, with a wide variety of stainless steels having been found suitable for this application. Other metals may also be employed for fabricating the sleeve, particularly where the application requires use of metals having properties different from that of stainless steel. Typical of other applicable metals or usable metals are aluminum and titanium, although others may be found useful in certain applications as well.

When an assembly including an interposed ceramic or glass-filled ceramic wafer is being utilized, the wafers are preferably fabricated from a blend of alumina ceramic with the glass such as 2164 glass mentioned hereinabove, with such materials being, of course, commercially available from Electro-Glass Corporation of Mammoth, Pa. As indicated above, however, useful devices may be prepared without requiring the utilization of an interposed high flow or melt point wafer, although certain applications may suggest its utilization.

PERFORMANCE

By way of performance criteria, when the electrode-sleeve wall or electrode-to-electrode distance is approximately 0.050 inches, and with a mixture of gas consisting primarily of nitrogen and Argon being present at atmospheric pressure. In such an arrangement, breakdown and/or ionization of the gas occurs at a voltage difference of between about 450 volts DC and 1500 volts DC, with such breakdown normally occurring in these devices at a potential difference of about 750 volts DC. As indicated hereinabove, and for the purpose of protecting the initiation devices against inadvertent actuation, a minimum potential difference of about 15 volts is desired for most automotive applications, with a breakdown maximum of no greater than 1500 volts having been found to be generally necessary.

This invention has been described herein in considerable detail in order to comply with the Patent Statutes and to provide those skilled in the art with the information needed to apply the novel principles and to construct and use the same. However, it is to be understood that the invention can be carried out by specifically different equipment and devices, and that various modifications, both as to the equipment details and operating procedures, can be accomplished without departing from the scope of the invention itself.

What is claimed is:

1. A glass hermetic seal incorporating a gas-filled electrical discharge tube comprising:

(a) a body member consisting of a cylindrical sleeve with inner and outer surfaces and a longitudinal axis;

(b) an electrically insulative glass rod disposed in sealed relationship with the inner surface of said cylindrical sleeve and having a gas-filled sealed chamber extending generally transversely to said longitudinal axis and being positioned generally midway along the length of said glass rod, and with the inner surface of said sleeve being in communication with said sealed chamber;

(c) at least one conductive elongated electrode extending through said glass rod and arranged parallel to said longitudinal axis and extending through said gas-filled sealed chamber; and (d) said gas fill consisting essentially of an ionizable gas at substantially atmospheric pressure.

2. The glass hermetic sealed incorporating a gas-filled electrical discharge tube as defined in claim 1 being particularly characterized in that said ionizable gas is a mixture of nitrogen and Argon.

3. The glass hermetic seal incorporating a gas-filled electrical discharge tube as defined in claim 1 being particularly characterized in that said glass rod comprises a pair of segments with at least one opposed segment having a groove formed across the diameter thereof to form a wafer interposed therebetween to define said gas-filled sealed chamber, said wafer being fabricated from a high temperature flowing compound selected from the group consisting of ceramic and glass-filled ceramic.

4. The glass hermetic seal incorporating a gas-filled electrical discharge tube as defined in claim 1 being particularly characterized in that a pair of elongated electrodes are provided in spaced apart relationship, each being parallel to the longitudinal axis of said cylinder.

5. The method of preparing a glass hermetic seal incorporating a gas-filled electrical discharge device comprising:

(a) providing a metal sleeve body member with an elongated central axis extending therethrough;

(b) providing a pair of electrically insulative glass rod segments for insertion within said metal sleeve body in end-to-end relationship to form a glass rod continuum, with each rod segment being coaxially arranged within said metal sleeve body;

(c) forming a cavity extending transversely across at least a portion of one end surface of at least one of said glass rod segments;

(d) forming at least one electrode receiving bore through the length of said rod segments, with the axis of said bore being parallel to the longitudinal axis of said rod segment and intersecting said transverses chamber;

(e) positioning a conductive electrode in each electrode receiving bore within said rod segments to form an electrode assembly;

(f) positioning said electrode assembly within said sleeve to form a discharge device assembly;

(g) placing said discharge device assembly within a heated chamber having an ionizable gas atmosphere and maintaining said discharge device assembly in contact with said ionizable gas atmosphere until said ionizable gas has displaced other gases present in said assembly; and (h) exposing said ionizable gas containing assembly to an elevated temperature for a time sufficient for said glass rod segments to fuse to the inner surface of said cylindrical sleeve and the outer surface of said electrode and thereby capturing said ionizable gas within said transverse chamber.

6. The method as defined in claim 5 wherein said ionizable gas atmosphere is a mixture of nitrogen and Argon.

7. The method as defined in claim 5 wherein a pair of parallelly disposed elongated electrodes are positioned in separate spaced apart electrode receiving bores within said rod segments.

* * * * *